(12) United States Patent
Hengstler et al.

(10) Patent No.: US 11,796,354 B2
(45) Date of Patent: Oct. 24, 2023

(54) MEASURING DEVICE WITH POSITION SENSOR

(71) Applicant: VEGA Grieshaber KG, Wolfach (DE)

(72) Inventors: Clemens Hengstler, Haslach (DE); Stefan Kaspar, Hofstetten (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 17/667,977

(22) Filed: Feb. 9, 2022

(65) Prior Publication Data

US 2022/0260396 A1    Aug. 18, 2022

(30) Foreign Application Priority Data

Feb. 12, 2021 (DE) ...................... 10 2021 201 364.3

(51) Int. Cl.
*G01D 11/24* (2006.01)
*G01D 9/00* (2006.01)

(52) U.S. Cl.
CPC ........... *G01D 11/245* (2013.01); *G01D 9/005* (2013.01)

(58) Field of Classification Search
CPC .............................. G01D 11/245; G01D 9/005
See application file for complete search history.

(56) References Cited

U.S. PATENT DOCUMENTS 7,765,878 B2 * 8/2010 Grotzer .................. G01F 15/00
                                                                 73/861.18
9,939,308 B2   4/2018 Weinzierle et al.

2016/0123787 A1 * 5/2016 Burgert ................... G01F 23/80
                                                                 73/290 V
2017/0299454 A1 * 10/2017 Hengstler ............. G01L 9/0091
2019/0373344 A1 * 12/2019 Haddy .................... G01S 19/13

FOREIGN PATENT DOCUMENTS

| DE | 10051151 A1 * | 4/2001 | ........... G01F 23/284 |
| DE | 102004050496 A1 * | 5/2006 | ............. G01D 3/024 |
| DE | 10 2006 062 600 A1 | 7/2008 | |
| DE | 10 2016 207 652 A1 | 11/2017 | |
| DE | 102016207652 A1 * | 11/2017 | |
| DE | 10 2019 130 530 A1 | 5/2021 | |
| EP | 3 054 271 A1 | 8/2016 | |
| EP | 3054271 A1 * | 8/2016 | ............. G01F 23/00 |
| EP | 2 057 453 B1 | 11/2018 | |
| GB | 2 578 607 A | 5/2020 | |
| WO | WO-0227349 A2 * | 4/2002 | ......... G01F 23/2845 |

OTHER PUBLICATIONS

German Office Action dated Oct. 28, 2021 in German Patent Application No. 10 2021 201 364.3, 6 pages.

* cited by examiner

*Primary Examiner* — Jamel E Williams
(74) *Attorney, Agent, or Firm* — Oblon, McClelland, Maier & Neustadt, L.L.P.

(57) ABSTRACT

A measuring device is provided for determining a filling level, a limit level, a pressure, or a flow rate of a material to be measured, including: a main body configured to be disposed above the material to be measured; a measuring body configured to be disposed below the main body, the measuring body including a sensor element configured to detect a measurement signal, and a position sensor configured to detect a position of the measuring body, the main body and the measuring body being formed separately from one another and being coupled to one another; and an evaluation device configured to evaluate the measurement signal detected by the sensor element and/or to evaluate the position of the measuring body.

8 Claims, 2 Drawing Sheets

MEASURING DEVICE WITH POSITION SENSOR

CROSS-REFERENCE TO RELATED APPLICATIONS

This application claims the benefit of the filing date of German Patent Application No. 10 2021 201 364.3, filed on 12 Feb. 2021, the entire content of which is incorporated herein by reference.

FIELD

The invention relates to measuring devices for containers, such as silos, tanks, etc., in an industrial environment. In particular, the invention relates to a measuring device for determining a level, a limit level, a pressure, or a flow in a container, a method for determining a level, a limit level, a pressure, or a flow in a container, as well as a use of such a measuring device for level measurement and/or limit level measurement and/or volume measurement and/or pressure measurement and/or flow measurement in a container.

BACKGROUND

Measuring devices in the industrial environment, in particular in the field of process or factory automation, can be provided as measuring devices for level measurement, level detection, flow measurement, pressure measurement, level measurement, and/or temperature measurement.

Known measuring devices are attached to the container, whereby the measuring devices are designed integrally, i.e., a measuring body is arranged directly on or in the container. In such measuring devices, position sensors can also be used to obtain additional information that can be used to make the actual measurement signals more precise.

SUMMARY

There may be a desire to provide an alternative measuring device, in particular a measuring device which makes it possible to detect measurement errors and/or damage to a measuring device.

This desire is met by the subject-matter of the independent claims. Further embodiments result from the dependent claims and the following description of embodiments.

A first aspect of the present disclosure relates to a measuring device for determining a level, a limit level, a pressure, or a flow rate of a material to be measured, which is arranged in a container, for example, wherein the measuring device can be set up in particular for process automation in an industrial environment.

The measuring device has a main body, a measuring body, and an evaluation unit. The main body is configured to be arranged above the material to be measured, for example, on a container. The measuring body is configured to be arranged below the main body, for example in the container, the measuring body having a sensor element for detecting a measurement signal and a position sensor for detecting a position of the measuring body. The main body and the measuring body are formed separately from each other and are coupled to each other. The evaluation unit is set up to evaluate the measurement signal detected by the sensor element and/or to evaluate the position of the measuring body.

The measuring device thus detects the position of the measuring body in the container and can thus in particular recognize whether measurement deviations and/or limitations of the measurement can occur due to the position of the measuring body, e.g., because the measuring body rests on the container bottom or rests at such an angle on a bulk material to be detected that the sensor element does not have sufficient contact with the bulk material to perform a valid measurement. In this way, potential consequential damage, e.g., rejects, process interruptions, and/or malfunctions, which can be caused by incorrect process control due to faulty measured values, can be detected at an early stage.

For example, errors in the commissioning or design of the sensors can be made in this way, e.g., if the measuring body, which is set off by a suspension cable, should hang freely downwards in the empty container, but the position sensor detects that the measuring body is in an inclined position. Based on this, a warning can be generated to alert the operator that either the container is not empty, as assumed, or that the suspension cable is too lagging and the measuring body is therefore resting on the container bottom. In this way, measurement errors and/or, depending on the measuring principle, incorrect adjustment can be prevented.

Furthermore, based on the position of the measuring body in the container, the measuring device can detect whether there is damage to the measuring body and/or the connection between the main body and the measuring body, which can lead to measurement inaccuracies and/or premature failure of the measuring device. Especially in the case that the main body and the measuring body are connected via a rigid connection, e.g., a tube, the determination of the position of the measuring body can detect that a manipulation and/or a damage is present, even before the sensor element and/or the measuring body, fails completely, because they should not experience a change in position due to their attachment or their rigid connection. In this way, consequential damage, such as rejects, process interruptions and/or malfunctions, can be prevented.

Furthermore, premature wear can be detected at an early stage and, based on this, predictive maintenance can be recommended and/or carried out to prevent unplanned equipment failure and the associated process interruption and/or malfunction.

The term "process automation in the industrial environment" can be understood as a subfield of technology that includes measures for the operation of machines and plants without the involvement of humans. One goal of process automation is to automate the interaction of individual components of a plant in areas such as chemicals, energy, food, pharmaceuticals, petroleum, paper, cement, shipping, or mining. For this purpose, a variety of sensors can be used, which are especially adapted to the specific requirements of the process industry, such as mechanical stability, insensitivity to contamination, extreme temperatures, and extreme pressures. Measured values from these sensors are usually transmitted to a control room or to a higher-level system in which process parameters such as level, limit level, gauge, flow rate, pressure, or density can be monitored and settings for the entire plant can be changed manually or automatically.

A subfield of process automation in the industrial environment concerns the logistics automation of plants and the logistics automation of supply chains. Distance and angle sensors are used in the field of logistics automation to automate processes inside or outside a building or within a single logistics facility. Typical applications include systems for logistics automation in the area of baggage and freight handling at airports, in the area of traffic monitoring (toll systems), in retail, parcel distribution or also in the area of building security (access control). Common to the examples listed above is that presence detection in combination with precise measurement of the size and position of an object is required by the respective application. Sensors based on optical measurement methods using lasers, light emitting diodes (LEDs), 2D cameras, or 3D cameras that measure distances according to the time-of-flight (ToF) principle can be used for this purpose.

Another subarea of process automation in the industrial environment is factory/production automation. Applications for this can be found in a wide variety of industries, such as automotive manufacturing, food production, the pharmaceutical industry, or generally in the field of packaging. The goal of factory automation is to automate the production of goods by machines, production lines and/or robots, i.e., to let it run without the involvement of humans. The sensors used in this process and the specific requirements with regard to measuring accuracy when detecting the position and size of an object are comparable to those in the previous example of logistics automation.

The main body can be designed as a connection box or connection housing, which can have a computing unit such as a central processing unit (CPU). The computing unit can be used at least partially to evaluate measurement signals, and/or to detect the position of the measuring body, and/or to store measurement signals or measurement data derived therefrom.

The measuring body, in particular the sensor element, can be a level sensor, a point level sensor, a pressure sensor, a temperature sensor, or a flow sensor. The sensor element can be, for example, a vibration limit switch, a pressure gauge, a pressure switch, a capacitive and/or a conductive measuring sensor.

The position sensor can be integrated in the sensor element 4 or provided separately from it in the measuring body 3, as described below with reference to FIG. 1. It can be a simple position sensor or a dynamic tilt sensor comprising, for example, an acceleration sensor and a gyroscope.

Due to the spatial separation of the main body and the measuring body, there is a higher risk of damage to the measuring body and/or the main body, which can be detected at an early stage by detecting the position of the measuring body by means of the position sensor and evaluating the detected position.

In other words, it can be said that in addition to measuring level, limit level, pressure, or flow, the measuring device makes it possible to detect measurement errors and/or commissioning errors and/or measurement restrictions and/or manipulation and/or damage and/or premature wear at an early stage. Furthermore, the measuring device can make it possible to detect changes in the process by evaluating the position information of the measuring body and/or optionally the position information of the associated evaluation unit.

According to one embodiment, the main body and the measuring body are coupled to each other via a cable and/or via a tube and/or via radio. In the case of radio coupling, the measuring body is preferably permanently installed in the container and sends the detected measuring signals to the main body by radio. The coupling between the main body and the measuring body via a cable allows the measuring body to hang vertically downwards even if the container is slightly tilted. In addition, cables allow the switch point to be lowered over longer distances, e.g., up to 80 m. Due to their flexibility, they can be installed more easily in confined spaces, especially above the vessel, and are more space-saving to transport.

Pipe connections between the main body and the measuring body make it possible to position the measuring body at a predefined point and to hold the measuring body in this position even if a content of the vessel, e.g., a filling material, moves, e.g., by filling or emptying the vessel or by an agitator present in the vessel. In addition, the pipe connections provide good chemical resistance, in particular due to the uses of stainless steel pipes. In particular, the chemical resistance of a pipe joint may be higher than that of a cable. Additionally, a pipe joint is easy to seal in fluid applications because the pipe joint can be easily welded shut. Furthermore, pipe connections can be used in a wide range of process temperatures, especially from −196° C. to +450° C. In the case of coupling by means of the cable, the position sensor in the measuring body is advantageous in particular because the measuring body can assume any position in this case, which can be detected by means of the position sensor. In particular, the position sensor in the measuring body can also detect damage to the tube as a coupling element in the case of rigid coupling via the tube.

According to one embodiment, the evaluation unit is provided in the main body and/or in the measuring body and/or as an external evaluation unit. The evaluation unit is set up, for example, to receive the measurement signals that are detected by the sensor element of the measuring body and to determine measurement data based on them. The evaluation unit for evaluating the measurement signals can preferably be provided in the main body. Additionally or alternatively, the main body can have an interface, for example a radio interface, which transmits the measurement data determined from the measurement signals and/or the measurement signals themselves to an external evaluation unit, for example a cloud, etc., for further processing. Furthermore, it is also conceivable that the detected position of the position sensor is evaluated directly in the measuring body and a signal based on this and corresponding to the evaluation of the position is transmitted to a main evaluation unit, preferably the evaluation unit in the main body.

However, it is also possible that the position of the measuring body detected by the position sensor is also evaluated in the evaluation unit provided in the main body. In other words, it is possible that the measuring device comprises several evaluation units, which can be provided in the measuring body and/or in the main body and/or externally, or comprises a central evaluation unit, which is preferably provided in the main body of the measuring device and evaluates both the measurement signals of the sensor element and the detected position of the position sensor and transmits only the measurement and/or position data based thereon to an external evaluation unit or data acquisition unit, which is used for further processing of the detected data.

According to one embodiment, the evaluation unit is set up to determine, based on a comparison of the detected position of the measuring body with a predetermined position limit value, that a correct position of the measuring body is present if the detected position of the measuring body essentially corresponds to the predetermined position limit value. The predetermined position limit value may be preset or may be manually entered or read into the system in advance. Additionally or alternatively, the position limit value can also be learned based on detected and stored position positions.

According to one embodiment, the main body further comprises a position sensor that is arranged to detect a position of the main body, and the evaluation unit is further arranged to evaluate the position of the main body. Additionally or alternatively, according to one embodiment, the evaluation unit is arranged to determine that a correct position of the measuring body is present based on a comparison of the detected position of the measuring body with the detected position of the main body if the detected position of the measuring body substantially corresponds to the detected position of the main body. Alternatively, if the position of the main body is sensed, the position of the sensing body may be compared to the sensed position of the main body to determine if the sensing body is in a correct position. If the position of the measuring body differs from the position of the main body, this may indicate incorrect positioning of the measuring body. Especially in the case of a rigid connection between the main body and the measuring body, e.g., by a tube, damage, and/or manipulation can be detected at an early stage.

According to one embodiment, the evaluation unit is set up to store position information obtained by evaluating the position of the measuring body. Storing the evaluated position data of the measuring body can be used to derive trend or limit values, which can then be used for adjustment for the recorded position. An evaluation of position data of the measuring body acquired and stored over a longer period of time makes it possible to detect an unusual change in position of the measuring body at an early stage, e.g., larger or smaller changes and/or more frequent or less frequent changes in position compared to normal operation. This can provide conclusions about the process to be monitored, e.g., different flow behavior of bulk material. Furthermore, it can be helpful to automatically generate the recommendation for preventive maintenance, e.g., in case of excessive stress due to frequent or particularly strong changes in position. By detecting changes in the process, potential negative effects on the product quality or the process flow can be identified at an early stage and thus scrap and/or an unplanned process interruption and/or a malfunction can be reduced or even completely prevented.

According to one embodiment, the measuring device may be designed as a self-sufficient measuring device, wherein the main body of the measuring device further comprises an energy supply unit and/or a storage unit. The energy supply unit can be provided to supply the measuring body with the energy necessary for operation. The memory unit is set up to store the acquired measurement signals and/or position signals over a longer period of time and additionally or alternatively to store the measurement data obtained therefrom in order to be able to derive trends, limit values, etc.

Another aspect of the present disclosure relates to a method for determining a level, a limit level, a pressure, or a flow rate in a container. The method comprises the steps of: detecting of a measurement signal by means of a sensor element of a measuring body of a measuring device arranged in the container; detecting, by means of a position sensor of the measuring body, a position of the measuring body; and evaluating, by means of an evaluation unit of a main body of the measuring device attached to the container, the measurement signal detected by the sensor element and/or the position of the measuring body detected by the position sensor.

The advantages stated above for the disclosed measuring device also apply to the disclosed method and are not stated again to avoid repetition.

In particular, such a method can be used to inform and/or alert a user if a conspicuous or unusual behavior, e.g., an undershooting or overshooting of limit values, and/or a trend is/are recognizable and/or the detected situation does not correspond to an expected value.

The position of the measuring body detected by the position sensor is preferably evaluated by comparison with a predetermined position limit value. The predetermined position limit value can be stored or taught in advance in the evaluation unit. Additionally or alternatively, the position limit value can be calculated via machine learning algorithms or comparable techniques based on the historical course of the stored position information. The position limit value defines a threshold value which, if exceeded or if a predetermined deviation from this threshold value is detected, triggers an alarm, for example in the form of a message, which informs the user thereof. In the case of a pipe connection, for example, the defined threshold value can be 1°, since even such a small change in position can indicate damage, e.g., bending of the pipe connection. In the case of a liquid application without agitator in the container, the defined threshold value can preferably be less than or equal to 5°. For bulk materials, for example, the defined threshold value can be less than or equal to 15°.

Another aspect of the present disclosure relates to a use of a measuring device described above and below for level measurement and/or level limit measurement and/or volume measurement and/or pressure measurement and/or flow measurement in a container.

Another aspect of the present disclosure relates to a program element that, when executed on a processor of a measuring device described above and below, instructs the measuring device to repeatedly perform the procedure described above and below.

Another aspect of the present disclosure relates to a computer readable medium having stored thereon the program element described above.

BRIEF DESCRIPTION OF THE FIGURES

Further embodiments are described below with reference to the figures. The representation in the figures is schematic and not to scale. The same or similar elements are given the same reference signs.

DETAILED DESCRIPTION OF EMBODIMENTS

Figure 1:
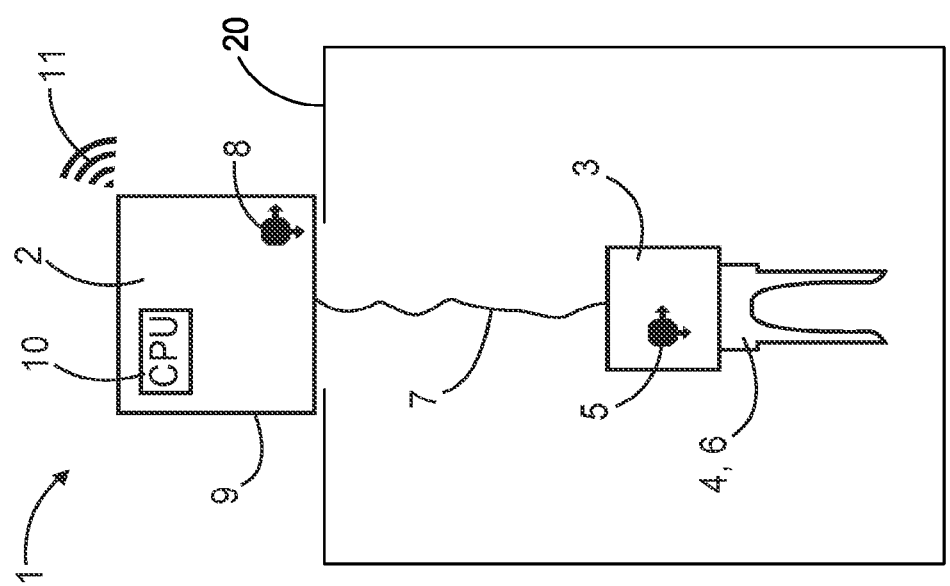
FIG. 1 shows a schematic representation of a measuring device according to an exemplary embodiment.

FIG. 1 shows a measuring device 1 according to an exemplary embodiment. The measuring device 1 has a main body 2, which is adapted to be arranged on a container 20, and a measuring body 3, which is adapted to be arranged in the container 20. The measuring body 3 comprises a sensor element 4 and a position sensor 5.

The sensor element 4 is configured here as an exemplary tuning fork 6. Alternatively, other sensor elements 4 are also conceivable, such as a pressure measuring cell, a capacitive electrode or the like. The position sensor 5 is set up to detect a position of the measuring body 3. The measuring body 3 is coupled to the main body 2 via a suspension cable 7. The suspension cable 7 enables the measuring body 3 to hang vertically downwards even if the container is slightly inclined. Furthermore, the suspension cable 7 is flexible and, in order to be able to implement different distances between the main body 2 and the measuring body 3, it can be at least partially gathered together. Furthermore, the carrying cable 7 serves to transmit the detected measurement signals and the detected position from the measuring body 3 to the main body 2.

The main body 2 has an evaluation unit 9 and a memory unit 10 provided integrally with the evaluation unit 9. The evaluation unit 9 receives the measurement signals and position detected by the measuring body 3 and evaluates them, i.e., the evaluation unit determines resulting measurement data based on the detected signals. The measurement data and/or the acquired measurement signals and position that have not yet been processed can be stored in the memory unit 10. If the data and signals are acquired and stored over a longer period of time, they can be used to determine limit values and/or derive trends. In addition, the stored data can be used to indicate maintenance at an early stage so that it can be carried out preventively and thus prevent process failures, rejects, etc.

The main body according to this exemplary embodiment also has a position sensor 8, but this is optional. The position sensor 8 is configured to detect the position of the main body 2. Thus, in addition or alternatively to comparison with a predetermined position limit value for the measuring body, the detected position of the measuring body can also be compared with the detected position of the main body in order to detect whether the measuring body is correctly positioned and/or whether there is incorrect positioning. In addition, the main body 2 has a radio interface 11, which is also optional, and is used to transmit the detected signals and the determined measurement data to an external evaluation unit or data processing unit (not shown) for external further processing. Such an interface can alternatively also be cable-connected.

Figure 2:
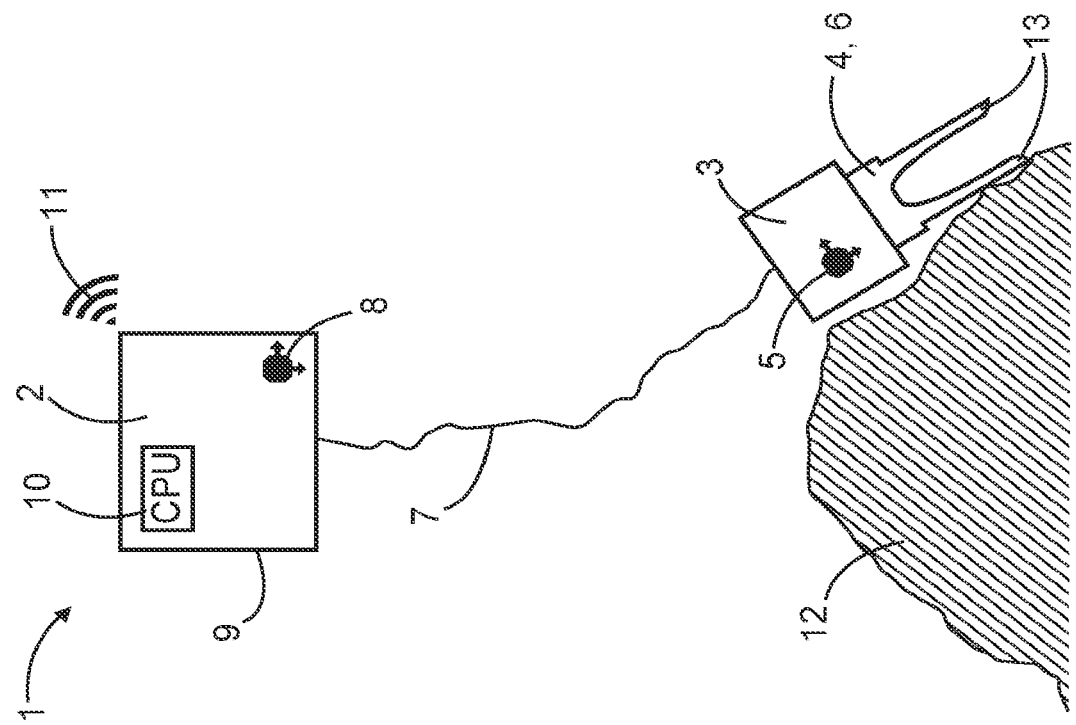
FIG. 2 shows a schematic representation of a measuring device according to an exemplary embodiment in contact with a bulk material.

FIG. 2 shows the measuring device 1 according to the exemplary embodiment from FIG. 1, whereby the measuring body 3 lies incorrectly positioned on a bulk material 12. FIG. 2 shows an application situation of the measuring device 1 in which the suspension cable 7, which couples the main body 2 and the measuring body 3 to each other, is too long. As a result, the measuring body 3 rests laterally at an angle on the bulk material 12. The sensor element 4, which is designed as a tuning fork 6, cannot make a valid measurement in this position, since the bulk material 12 must be arranged between two fork legs 13 of the tuning fork 6 in order to obtain a valid measurement.

In the position of the measuring body shown, its oblique position is detected by the position sensor 5 and compared by the evaluation unit 9 with a predetermined position limit value and/or with the position of the main body 2 detected by the position sensor 8. Based on the comparison, the evaluation unit 9 determines that the position of the measuring body 3 does not match the position of the main body 2 or that the position of the measuring body 3 deviates from the predetermined position limit value. Based on this result, a message can be output to a user indicating in that the measuring body 3 is positioned incorrectly and measurement errors may occur. In addition, a message can also be generated indicating to the user that the suspension cable 7 is too long.

Figure 3:
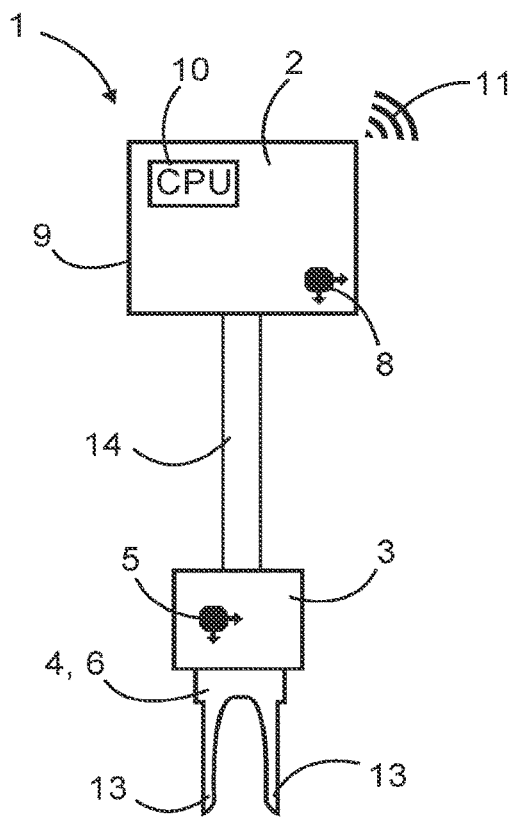
FIG. 3 shows a schematic representation of a measuring device according to a further exemplary embodiment in an intact state.
Figure 4:
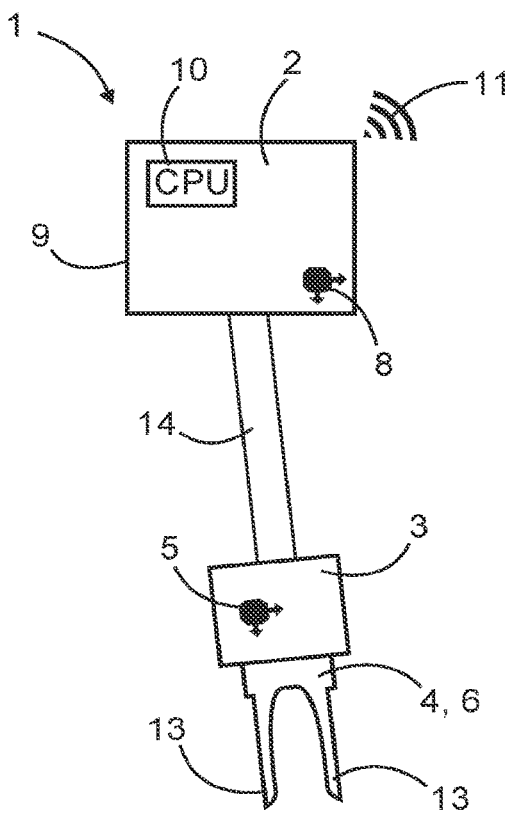
FIG. 4 shows a schematic representation of a measuring device according to the further exemplary embodiment in a damaged state.

FIGS. 3 and 4 show a further exemplary embodiment of the measuring device 1, which essentially corresponds to the embodiment shown in FIGS. 1 and 2. Therefore, only the differences will be discussed below. In the exemplary embodiment shown here, the main body 2 and the measuring body 3 are rigidly coupled to each other via a tube 14. A cable can run inside the tube 14, which is used to transmit the signals detected in the measuring body 3, that is, the measurement signals detected by the sensor element 4 and the position detected by the position sensor 5.

Due to the rigid connection by means of the tube 14, the measuring body 3 must not undergo any change in position. If, however, a change in position of the measuring body 3 is determined by comparing the position detected by the position sensor 5 with the predetermined position limit value and/or the position of the main body 2 detected by the position sensor 8, it is possible to conclude that there has been damage and/or manipulation, e.g., bending and/or kinking of the tube 14 (see FIG. 4). Based on this, a message can be issued to the user indicating the damage.

Such a message can be given visually, e.g., by means of a light emitting diode (LED) attached to the measuring device 1, and/or via an interface of the measuring device 1. The interface can be an operating interface of the measuring device 1, a regular data interface of the measuring device 1, e.g., 4 to 20 mA/HART, to which a host or a controller is connected, or a radio interface, e.g. BLUETOOTH®, long range (LoRa), mobile radio, short message service (SMS), wireless local area network (WLAN), etc., whereby the transmission of the message takes place by means of the radio interface, e.g., to a host, a connected controller, a mobile radio device, or a cloud application. In addition, Profibus DP (decentralized peripherals), Foundation Fieldbus, Ethernet Advanced Physical Layer (Ethernet APL), IO-Link, and/or controller area network (CAN) can be used as interfaces.

Figure 5:
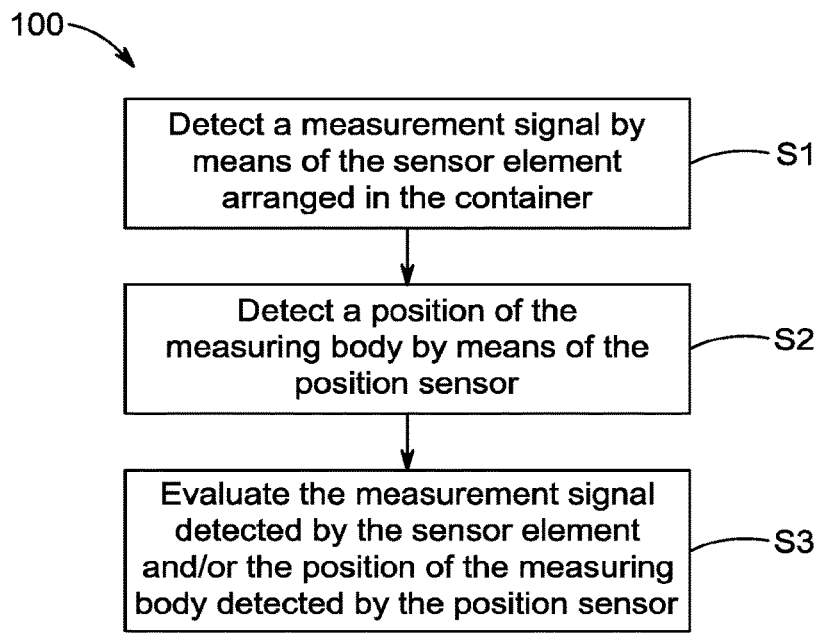
FIG. 5 shows a flow diagram of a process according to an exemplary embodiment.

FIG. 5 shows a flow diagram of a method 100 according to an exemplary embodiment. In a step S1, a measurement signal is detected by means of the sensor element 4 of the measuring body 3 of the measuring device 1 arranged in the container. In a step S2, the position of the measuring body 3 is detected by means of the position sensor 5 of the measuring body 3. In a step S3, the measurement signal detected by the sensor element 4 and/or the position of the measuring body 3 detected by the position sensor 5 is evaluated by the evaluation unit 9.

Based on the result of this evaluation, a message can then be generated that informs the user in particular of incorrect positioning of the measuring body 3.

The invention claimed is:

1. A measuring device, configured to determine a filling level, a limit level, or a flow rate of a material to be measured, comprising:
   a main body configured to be disposed above the material to be measured and configured to be mounted to a container, wherein the main body includes an evaluation unit configured to determine measurement data based on measurement signals; and
   a measuring body configured to be disposed below the main body and configured to be arranged in the container, the measuring body having a sensor element configured to detect the measurement signals, and a position sensor configured to detect a position of the measuring body,
   wherein the main body and the measuring body are formed separately from each other and are mechanically coupled to each other via a cable and/or via a tube, wherein the cable or the tube is configured to carry the measuring body, and wherein the main body and the measuring body are electrically signal-coupled via the cable to transmit the detected measurement signals and the detected position, wherein the evaluation unit is further configured to evaluate the measurement signals detected by the sensor element and/or to evaluate the position of the measuring body, and wherein the evaluation unit is further configured to determine, based on a comparison of the detected position of the measuring body with a predetermined position limit value, that a correct position of the measuring body is present if the detected position of the measuring body substantially corresponds to the predetermined position limit value.

2. The measuring device according to claim 1, wherein the main body and the measuring body are coupled to each other via radio.

3. The measuring device according to claim 1, wherein the main body further comprises a position sensor, which is configured to detect a position of the main body, and the evaluation unit is further configured to evaluate the position of the main body.

4. The measuring device according to claim 3, wherein the evaluation unit is further configured to determine, based on a comparison of the detected position of the measuring body with the detected position of the main body, that a correct position of the measuring body is present if the detected position of the measuring body essentially corresponds to the detected position of the main body.

5. The measuring device according to claim 1, wherein the evaluation unit is further configured to store position information obtained by evaluating the position of the measuring body.

6. A method for determining a filling level, a limit level, or a flow rate in a container, comprising the steps of:

detecting measurement signals by a sensor element of a measuring body of a measuring device arranged in the container, wherein the measuring body is arranged separately from a main body of the measuring device, the main body being mounted to a container, wherein the measuring body is mechanically coupled to the main body via a cable and/or via a tube, wherein the cable or the tube carries the measuring body, and wherein the main body includes an evaluation unit configured to determine measurement data based on the measurement signals;

detecting, by a position sensor of the measuring body, a position of the measuring body; and evaluating, by the evaluation unit of the main body of the measuring device attached to the container, the measurement signals detected by the sensor element and/or the position of the measuring body detected by the position sensor, wherein the main body and the measuring body are electrically signal-coupled via the cable to transmit the detected measurement signals and the detected position, and wherein the evaluation unit is further configured to determine, based on a comparison of the detected position of the measuring body with a predetermined position limit value, that a correct position of the measuring body is present if the detected position of the measuring body substantially corresponds to the predetermined position limit value.

7. The measuring device according to claim 1, wherein the measuring device is configured for level measurement and/or limit level measurement and/or volume measurement and/or flow measurement in a container.

8. A nontransitory computer-readable storage medium comprising computer program instructions stored therein, which, when executed on a processor of a measuring device according to claim 1, instructs the measuring device to repeatedly perform a method for determining a filling level, a limit level, or a flow rate in a container, comprising the steps of:

detecting measurement signals by a sensor element of a measuring body of a measuring device arranged in the container, wherein the measuring body is arranged separately from a main body of the measuring device, the main body being mounted to a container, wherein the measuring body is mechanically coupled to the main body via a cable and/or via a tube, wherein the cable or the tube carries the measuring body, and wherein the main body includes an evaluation unit configured to determine measurement data based on the measurement signals;

detecting, by a position sensor of the measuring body, a position of the measuring body; and evaluating, by the evaluation unit of the main body of the measuring device attached to the container, the measurement signals detected by the sensor element and/or the position of the measuring body detected by the position sensor, wherein the main body and the measuring body are electrically signal-coupled via the cable to transmit the detected measurement signals and the detected position, and wherein the evaluation unit is further configured to determine, based on a comparison of the detected position of the measuring body with a predetermined position limit value, that a correct position of the measuring body is present if the detected position of the measuring body substantially corresponds to the predetermined position limit value.

* * * * *